United States Patent
Kim et al.

(10) Patent No.: US 10,402,065 B2
(45) Date of Patent: Sep. 3, 2019

(54) METHOD AND APPARATUS FOR OPERATING A VIRTUAL KEYBOARD

(71) Applicant: Samsung Electronics Co., Ltd., Gyeonggi-do (KR)

(72) Inventors: Geon-Soo Kim, Gyeonggi-do (KR); Yong-Joon Jeon, Gyeonggi-do (KR); Jin-Hong Jeong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 392 days.

(21) Appl. No.: 14/503,150

(22) Filed: Sep. 30, 2014

(65) Prior Publication Data
US 2015/0095833 A1 Apr. 2, 2015

(30) Foreign Application Priority Data
Sep. 30, 2013 (KR) .................. 10-2013-0116284

(51) Int. Cl.
*G06F 3/0481* (2013.01)
*G06F 3/0489* (2013.01)
(Continued)

(52) U.S. Cl.
CPC ........ *G06F 3/04842* (2013.01); *G06F 3/0484* (2013.01); *G06F 3/0488* (2013.01); *G06F 3/0489* (2013.01); *G06F 3/04812* (2013.01); *G06F 3/04817* (2013.01); *G06F 3/04886* (2013.01); *G06F 3/04895* (2013.01); *G06F 2203/04804* (2013.01)

(58) Field of Classification Search
CPC ................ G06F 3/0236; G06F 3/0238; G06F 2203/04804; G06F 8/38
USPC ................................ 715/773, 780, 768, 902
See application file for complete search history.

(56) References Cited

U.S. PATENT DOCUMENTS

| 5,651,107 A | 7/1997 | Frank et al. |
| 7,768,501 B1 | 8/2010 | Maddalozzo, Jr. et al. |

(Continued)

FOREIGN PATENT DOCUMENTS

| KR | 10-2006-0101293 | 9/2006 |
| KR | 10-2009-0025568 | 3/2009 |

(Continued)

OTHER PUBLICATIONS

Extended European Search Report dated Feb. 5, 2015 in connection with European Application No. 14186746.5; 7 pages.

(Continued)

*Primary Examiner* — Joy M Weber

(57) ABSTRACT

A method for operating an electronic device includes displaying a first input window on a screen, displaying a first input window in a first layer on a screen; displaying a virtual keyboard in a second layer over the first layer; determining whether the virtual keyboard is overlapped with the first input window; and in response to determine whether the virtual keyboard is overlapped with the first input window: displaying a second input window in a third layer over the second layer wherein the second input window is not overlapped with the virtual keyboard, or adjusting a transparency of the virtual keyboard. Other embodiments including an electronic device and a computer-readable medium are also disclosed.

11 Claims, 17 Drawing Sheets

(51) Int. Cl.
*G06F 3/0484* (2013.01)
*G06F 3/0488* (2013.01)

(56) References Cited

U.S. PATENT DOCUMENTS

| | | | | |
|---|---|---|---|---|
| 8,922,479 | B2 * | 12/2014 | Pennington, II | G06F 3/04883 |
| | | | | 345/156 |
| 9,116,615 | B2 * | 8/2015 | Ng | G06F 3/04886 |
| 9,448,722 | B2 * | 9/2016 | Yuan | G06F 3/04883 |
| 2003/0071850 | A1 * | 4/2003 | Geidl | G06F 3/0481 |
| | | | | 715/781 |
| 2005/0169527 | A1 * | 8/2005 | Longe | G06F 3/0237 |
| | | | | 382/177 |
| 2005/0275633 | A1 * | 12/2005 | Varanda | G06F 3/0481 |
| | | | | 345/173 |
| 2006/0033724 | A1 | 2/2006 | Chaudhri et al. | |
| 2010/0169818 | A1 * | 7/2010 | Hughes | G06F 3/0481 |
| | | | | 715/773 |
| 2010/0323762 | A1 * | 12/2010 | Sindhu | G06F 1/1613 |
| | | | | 455/566 |
| 2011/0302520 | A1 * | 12/2011 | Yuasa | G06F 3/04886 |
| | | | | 715/773 |
| 2013/0135350 | A1 | 5/2013 | Santos-Gomez et al. | |

FOREIGN PATENT DOCUMENTS

| | | | |
|---|---|---|---|
| KR | 1020110107059 A | 9/2011 | |
| KR | 10-2012-0016060 | 2/2012 | |
| KR | 101294458 B1 * | 8/2013 | G06F 3/04886 |

OTHER PUBLICATIONS

Office Action dated May 4, 2018 in connection with European Patent Application No. 14 186 746.5.

* cited by examiner

METHOD AND APPARATUS FOR OPERATING A VIRTUAL KEYBOARD

PRIORITY

The present application is related to and claims priority under 35 U.S.C. § 119(a) to a Korean Patent Application No. 10-2013-0116284 filed in the Korean Intellectual Property Office on Sep. 30, 2013, the contents of which are herein incorporated by reference.

TECHNICAL FIELD

The present disclosure relates to a method for displaying in an electronic device and the electronic device thereof.

BACKGROUND

An electronic device such as a smart phone, a tablet Personal Computer (PC) or the like uses a display module having a touch screen function. By using the touch screen function, the display module displays a software keyboard capable of inputting a text and the like desired by a user. The software keyboard can be called a floating keyboard and the like, for example. Below, the software keyboard is abbreviated as a 'keyboard'.

SUMMARY

A method for operating an electronic device includes displaying a first input window on a screen, displaying a first input window in a first layer on a screen; displaying a virtual keyboard in a second layer over the first layer; determining whether the virtual keyboard is overlapped with the first input window; and in response to determine whether the virtual keyboard is overlapped with the first input window: displaying a second input window in a third layer over the second layer wherein the second input window is not overlapped with the virtual keyboard, or adjusting a transparency of the virtual keyboard.

In some embodiments, the first input window comprises a cursor activated on the screen.

In some embodiments, the virtual keyboard becomes transparent such that a letter of the first input window is visible through the virtual keyboard.

In some embodiments, the letter is entered into the first input window and the second input window at a substantially same time.

The method of claim 1, when the first input window is selected, the virtual keyboard appears.

In some embodiments, the second input window is displayed at a transparency greater than a transparency of the first input window.

In some embodiments, a horizontal length of the second input window is fixed, or is gradually extended as a number of letters increases.

In some embodiments, the second input window is displayed in a flashing state corresponding to a time interval of a key input typed through the virtual keyboard.

In some embodiments, the transparency of either a whole of the virtual keyboard, or only an overlapped area of the virtual keyboard is increased.

In some embodiments, the transparency of the virtual keyboard is less than 50 percentage.

An electronic device comprising: a display configured to: display a first input window in first layer on a screen; and display a virtual keyboard in a second layer over the first layer; and a processor configured to: determine whether the virtual keyboard is overlapped with the first input window; and in response to determine whether the virtual keyboard is overlapped with the first input window: cause the display to display a second input window in a third layer over the second layer wherein the second input window is not overlapped with the virtual keyboard, or adjust a transparency of the virtual keyboard.

A computer-readable storage medium storing a computer program that, when executed by one or more processors, causes the one or more processors to perform acts comprising: displaying a first input window in a first layer on a screen; displaying a virtual keyboard in a second layer over the first layer; determining whether the virtual keyboard is overlapped with the first input window; and in response to determine whether the virtual keyboard is overlapped with the first input window: displaying a second input window in a third layer over the second layer wherein the second input window is not overlapped with the virtual keyboard, or adjusting a transparency of the virtual keyboard.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
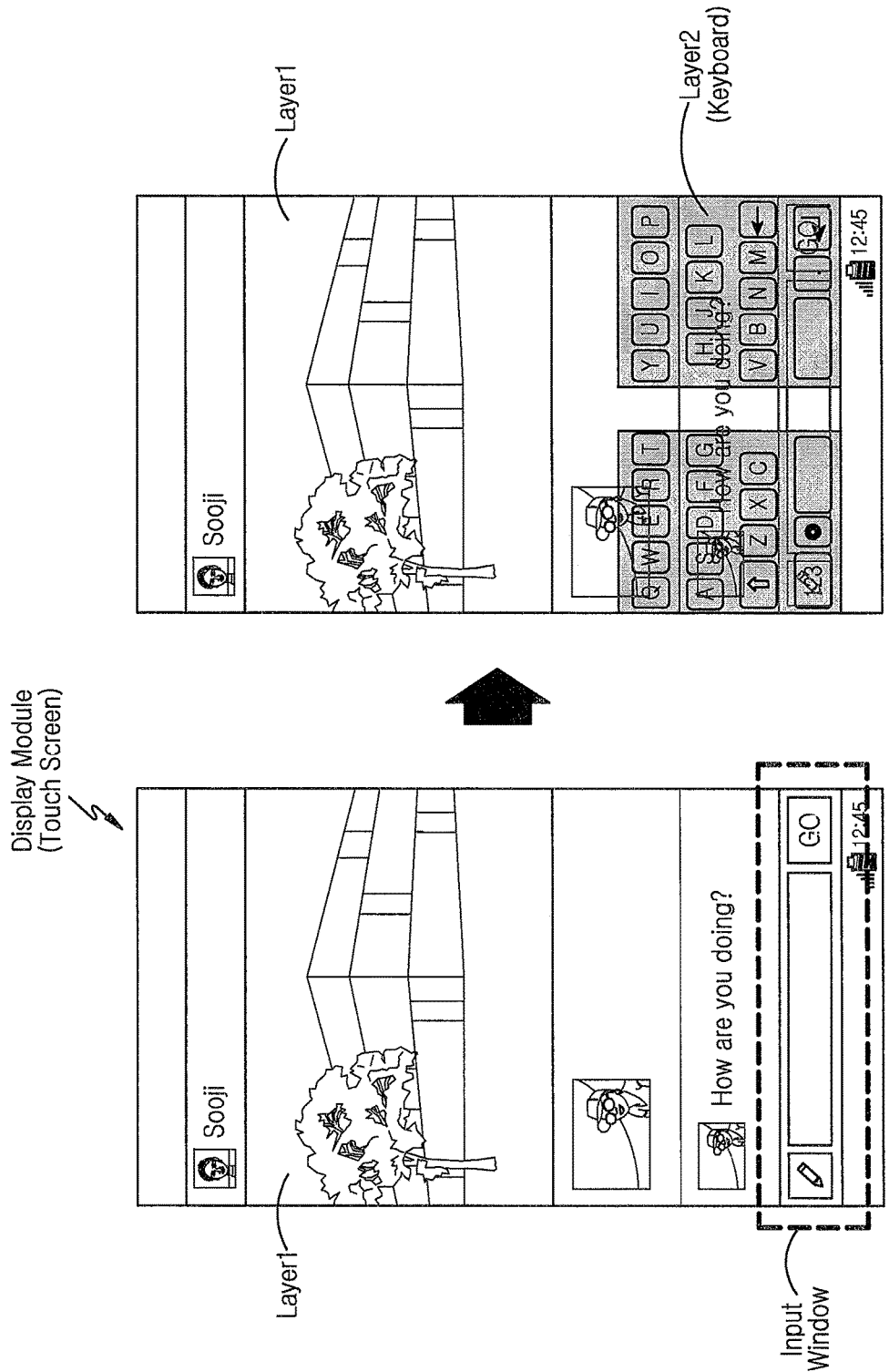
FIGS. 1A and 1B are diagrams illustrating embodiments in which a keyboard of a $2^{nd}$ layer is overlapped with an input window of a $1^{st}$ layer.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The present disclosure is described below with reference to the accompanying drawings. The present disclosure illustrates specific exemplary embodiments in the drawings and discloses related detailed descriptions, but various modifications can be made and several exemplary embodiments can be provided. Accordingly, the present disclosure does not intend to be limited to a specific embodiment form, and it should be understood that the present disclosure includes all modifications or equivalents or substitutes included in the spirit and technological scope of the present disclosure. In relation to the description of the drawing, like constituent elements are denoted by like reference symbols.

An electronic device according to the present disclosure can be a device including a communication function. For example, the electronic device can be one or more combinations of various electronic devices such as a smart phone, a tablet Personal Computer (PC), a mobile phone, a video phone, an electronic book reader, a desktop PC, a laptop PC, a netbook computer, a Personal Digital Assistant (PDA), a Portable Media Player (PMP), an MPEG Audio Layer 3 (MP3) player, a mobile medical instrument, an electronic bracelet, an electronic necklace, an electronic accessory, a camera, a wearable device, an electronic watch, a wrist watch, smart home appliances (e.g., a refrigerator, an air conditioner, a cleaner, an artificial intelligence robot, a TV, a Digital Versatile Disc (DVD) player, an audio system, an oven, a microwave, a washing machine, an air cleaner, an electronic frame, and the like), various medical instruments (e.g., Magnetic Resonance Angiography (MRA), Magnetic Resonance Imaging (MRI), Computerized Tomography (CT), a moving-camera, an ultrasound machine and the like), a navigation device, a Global Positioning System (GPS) receiver, an Event Data Recorder (EDR), a Flight Data Recorder (FDR), a settop box, a TV box (for example, Samsung HomeSyn™, AppleTV™, or Google TV™), an electronic dictionary, a vehicle infotainment device, a vessel electronic equipment (for example, a vessel navigation device, a gyrocompass and the like), a flight electronic instrument, a security instrument, an electronic clothes, an electronic locking system, a camcorder, a game console, a Head Mounted Display (HMD), a flat display device, an electronic album, part of a furniture or building/structure including a communication function, an electronic board, an electronic signature input device, a projector, and the like. It is obvious to those skilled in the art that the electronic device according to the present disclosure is limited to the aforementioned instruments.

As illustrated in FIGS. 1A to 1B, a display module displays in a $1^{st}$ layer a main screen including an input window in which a cursor is activated, for example. The display module displays a keyboard in a $2^{nd}$ layer that is lamination-layered on the $1^{st}$ layer. If a user touches a key button arranged in the keyboard of the $2^{nd}$ layer, the display module displays a text and the like corresponding to the key button in the input window of the $1^{st}$ layer. On the other hand, when the keyboard of the $2^{nd}$ layer is overlapped with the input window of the $1^{st}$ layer, the user cannot confirm the text and the like displayed in the input window of the $1^{st}$ layer.

Figure 2:
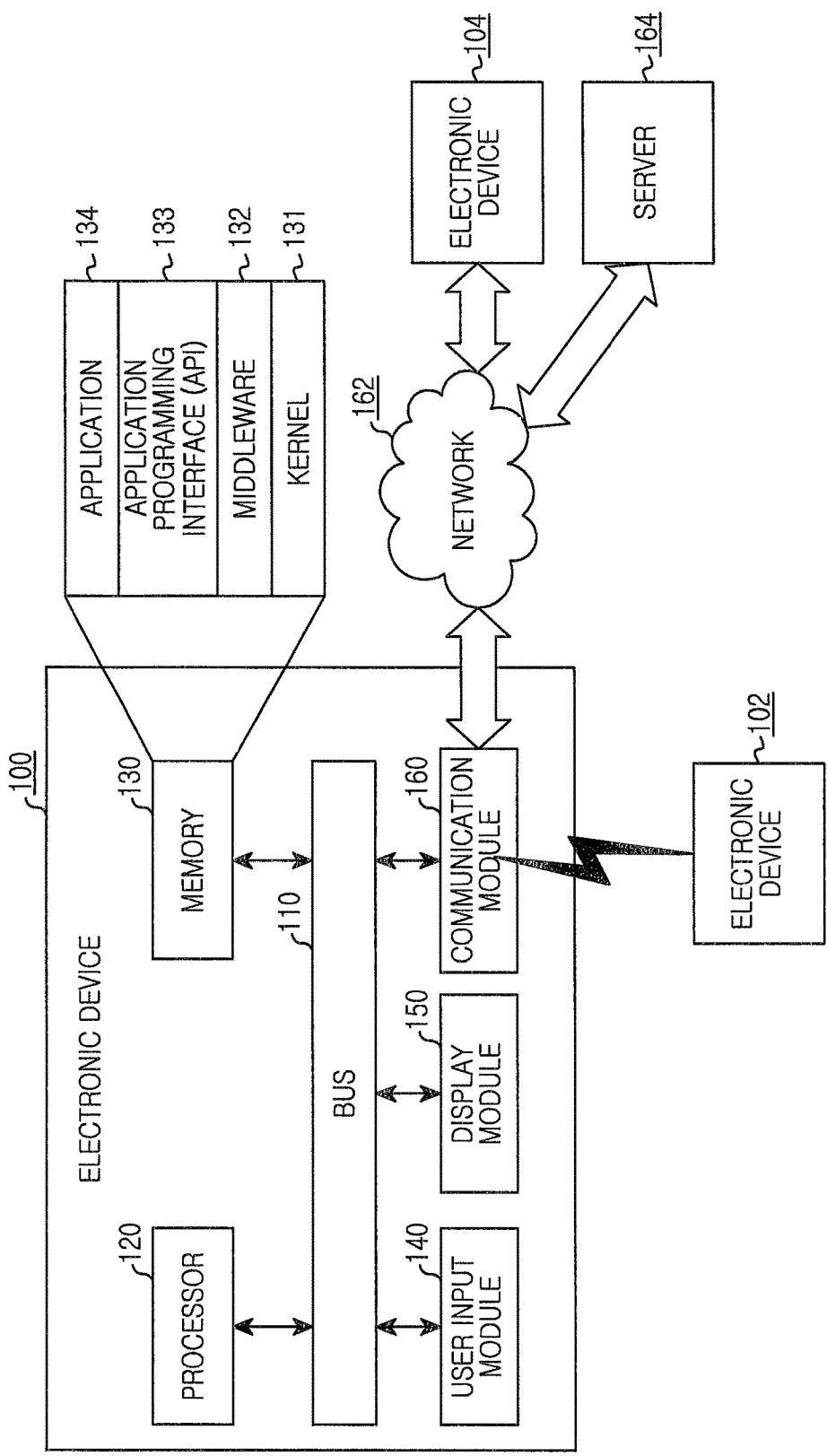
FIG. 2 is a block diagram illustrating a construction of an electronic device according to one embodiment of the present disclosure.

FIG. 2 is a block diagram illustrating a construction of an electronic device according to one exemplary embodiment of the present disclosure. Referring to FIG. 2, the electronic device 100 can include a bus 110, a processor 120, a memory 130, a user input module 140, a display module 150, and a communication module 160. The bus 110 can be a circuit connecting the aforementioned constituent elements with one another, and forwarding communication (e.g., control message) between the aforementioned constituent elements. The processor 120 can, for example, receive instructions from the aforementioned other constituent elements (e.g., the memory 130, the user input module 140, the display module 150, the communication module 160, and the like) through the bus 110, decipher the received instructions, and execute operation or data processing according to the deciphered instructions.

The memory 130 can store an instruction or data which is received from the processor 120 or the other constituent elements (e.g., the user input module 140, the display module 150, the communication module 160, and the like) or is generated by the processor 120 or the other constituent elements. The memory 130 can include, for example, programming modules such as a kernel 131, a middleware 132, an Application Programming Interface (API) 133, applications 134 and the like. The aforementioned respective programming modules can be composed of software, firmware, hardware or a combination of at least two or more of them.

The kernel 131 can control or manage system resources (e.g., the bus 110, the processor 120, the memory 130 and the like) used for executing operations or functions implemented in the remnant other programming modules, for example, the middleware 132, the API 133, and the applications 134. The kernel 131 can provide an interface of enabling the middleware 132, the API 133, or the applications 134 to access and control or manage the individual constituent element of the electronic device 100. The middleware 132 can perform a relay role of enabling the API 133 or the applications 134 to communicate and exchange data with the kernel 131. Also, in relation with work requests received from (a plurality of) applications 134, the middleware 132 can, for example, perform work request load balancing using a method of giving priority order of using the system resources (e.g., the bus 110, the processor 120, the memory 130 or the like) of the electronic device 100 to at least one application among (the plurality of) applications 134.

The API 133 is an interface of enabling the applications 134 to control a function provided by the kernel 131 or the middleware 132. The API 133 can include, for example, at least one interface or function for file control, window control, picture processing, character control or the like. The user input module 140 can, for example, receive an input of an instruction or data from a user and forward the instruction or data to the processor 120 or the memory 130 through the bus 110. The display module 150 can display a picture, a video, data or the like to the user. The communication module 160 can connect communication between the electronic device 100 and other electronic device 102. The communication module 160 can support a certain short-range communication protocol (e.g., Wireless Fidelity (WiFi), Bluetooth (BT), or Near Field Communication (NFC)), and certain network communication 162 (e.g., the Internet, a Local Area Network (LAN), a Wide Area Network (WAN), a telecommunication network, a cellular network, a satellite network, a Plain Old Telephone System (POTS) or the like). The network communication 162 is connected to the server 164. The electronic devices 102 and 104 each can be the same (e.g., same type) device as the electronic device 100 or can be a different (e.g., different type) device.

Figure 3:
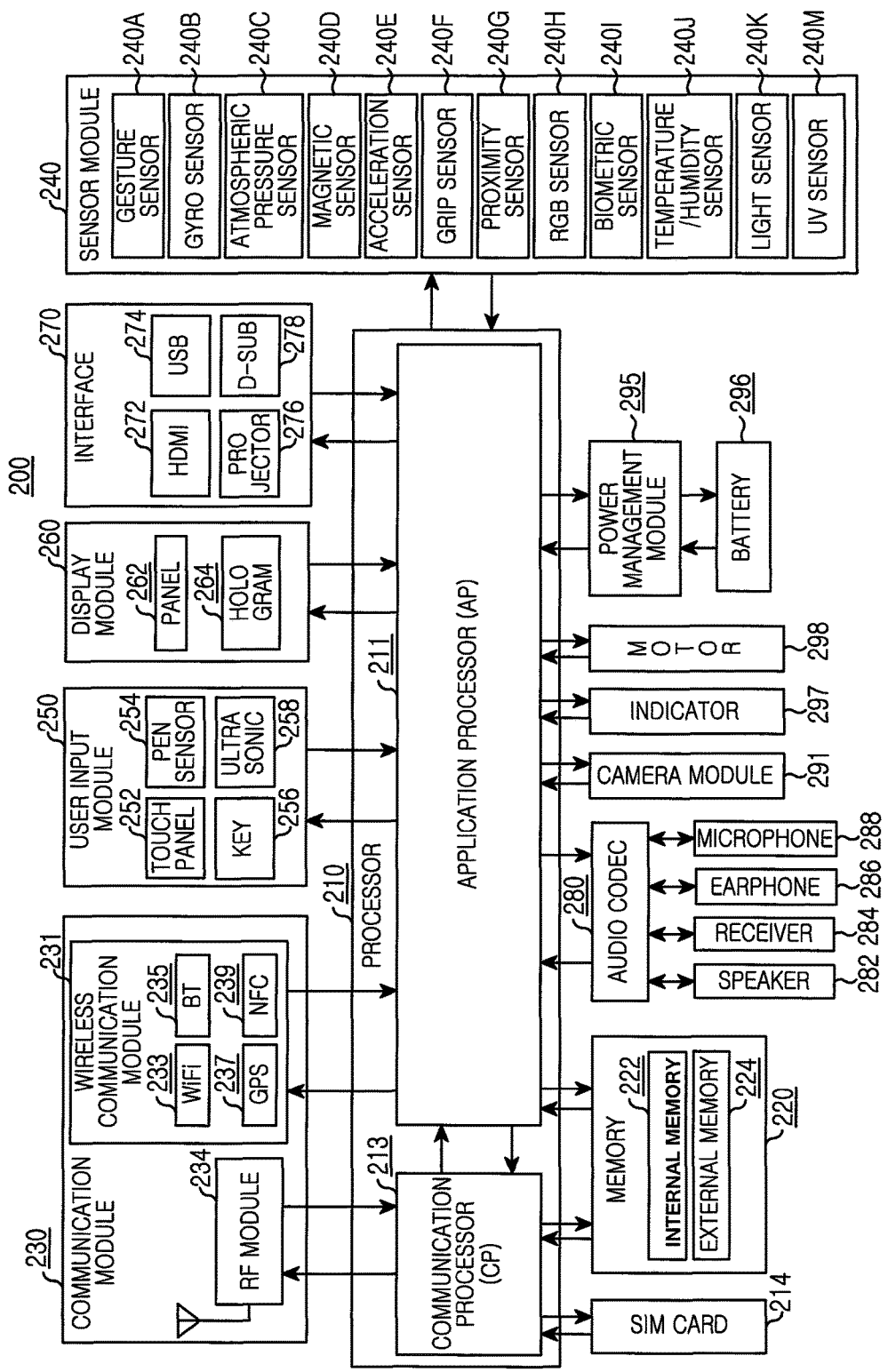
FIG. 3 is a block diagram illustrating a construction of hardware according to one embodiment of the present disclosure.

FIG. 3 is a block diagram illustrating a construction of hardware according to one exemplary embodiment of the present disclosure. The hardware 200 can be, for example, the electronic device 100 illustrated in FIG. 2. Referring to FIG. 3, the hardware 200 include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 can include one or more Application Processors (APs) 211 or one or more Communication Processors (CPs) 213. The processor 210 can be, for example, the processor 120 illustrated in FIG. 2. Although FIG. 3 illustrates that the AP 211 and the CP 213 are included within the processor 210, the AP 211 and the CP 213 can be included within different IC packages, respectively. In one exemplary embodiment, the AP 211 and the CP 213 can be included within one IC package.

The AP 211 can drive an operating system or an application program and control a plurality of hardware or software constituent elements connected to the AP 211, and perform processing and operations of various data including multimedia data. The AP 211 can be, for example, implemented as a System on Chip (SoC). According to one exemplary embodiment, the processor 210 can further include a Graphic Processing Unit (GPU) (not shown). The CP 213 can perform a function of managing a data link and converting a communication protocol in a communication between an electronic device (e.g., the electronic device 100) including the hardware 200 and other electronic devices connected through a network 162. The CP 213 can be implemented as a SoC, for example.

According to one exemplary embodiment, the CP 213 can perform at least part of a multimedia control function. The CP 213 can perform terminal discrimination and authentication within a communication network using a subscriber identity module (e.g., the SIM card 214). Also, the CP 213 can provide services such as voice telephony, video telephony, a text message, packet data or the like to a user. Also, the CP 213 can control data transmission/reception of the communication module 230. Although FIG. 3 illustrates the constituent elements such as the CP 213, the power management module 295, the memory 220 and the like as constituent elements separate from the AP 211, according to one exemplary embodiment, the AP 211 can be implemented to include at least some (e.g., the CP 213) of the aforementioned constituent elements.

According to one exemplary embodiment, the AP 211 or the CP 213 can load to a volatile memory an instruction or data received from a nonvolatile memory which is connected to each of the AP 211 and the CP 213 or at least one of other constituent elements, and process the loaded instruction or data. Also, the AP 211 or the CP 213 can store in the nonvolatile memory data which are received from at least one of the other constituent elements or are generated by at least one of the other constituent elements. The SIM card 214 can be a card including the subscriber identity module, and can be inserted into a slot provided in a specific location of the electronic device. The SIM card 214 can include unique identification information (e.g., Integrated Circuit Card ID (ICCID)) or subscriber information (e.g., International Mobile Subscriber Identity (IMSI)).

The memory 220 can include an internal memory 222 or an external memory 224. The memory 220 can be, for example, the memory 130 illustrated in FIG. 2. The internal memory 222 can include, for example, at least one of a volatile memory (e.g., a Dynamic Random Access Memory (DRAM), a Static Random Access Memory (SRAM), a Synchronous Dynamic Random Access Memory (SDRAM) and the like) or a nonvolatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like). According to one exemplary embodiment, the internal memory 222 can take a form of Solid State Drive (SSD). The external memory 224 can further include, for example, Compact Flash (CF), Secure Digital (SD), Micro Secure Digital (Micro-SD), Mini Secure Digital (Mini-SD), extreme Digital (xD), a memory stick or the like.

The communication module 230 can include a wireless communication module 231 or a Radio Frequency (RF) module 234. The communication module 230 can be, for example, the communication module 160 illustrated in FIG. 2. The wireless communication module 231 can include, for example, WiFi 233, BT 235, GPS 237 or NFC 239. For example, the wireless communication module 231 can provide a wireless communication function using radio frequency. Additionally or alternatively, the wireless communication module 231 can include a network interface (e.g., a LAN card), a modem or the like for connecting the hardware 200 with a network (e.g., the Internet, a LAN, a WAN, a telecommunication network, a cellular network, a satellite network, a POTS or the like).

The RF module 234 can take charge of transmission/reception of data, for example, transmission/reception of an RF signal or a called electric signal. The RF module 234 can include, though not illustrated, for example, a transceiver, a Power Amp Module (PAM), a frequency filter, a Low Noise Amplifier (LNA) or the like. Also, the RF module 234 can further include a component for transmitting/receiving an electromagnetic wave on a free space in a wireless communication, for example, a conductor, a conductive line or the like. The sensor module 240 can include, for example, at least one of a gesture sensor 240A, a gyro sensor 240B, an air pressure sensor 240C, a magnetic sensor 240D, an accelerator sensor 240E, a grip sensor 240F, a proximity sensor 240G, a Red Green Blue (RGB) sensor 240H, a biological sensor 240I, a temperature/humidity sensor 240J, a light sensor 240K, and a Ultraviolet (UV) sensor 240M. The sensor module 240 can measure a physical quantity or sense an activation state of the electronic device and convert the measured or sensed information into an electrical signal.

Additionally or alternatively, the sensor module 240 can include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown) or the like. The sensor module 240 can further include a control circuit for controlling at least one or more sensors provided therein. The user input module 250 can include a touch panel 252, a (digital) pen sensor 254, a key 256, or an ultrasonic input device 258. The user input module 250 can be, for example, the user input module 140 illustrated in FIG. 2. The touch panel 252 can recognize, for example, a touch input in at least one method among a capacitive method, a pressure sensitive method, an infrared method, and an ultrasonic method.

Also, the touch panel 252 may further include a controller (not shown). In the capacitive method, not only direct touch but also proximity recognition is possible. The touch panel 252 can further include a tactile layer. In this case, the touch panel 252 can provide a tactile response to a user. The (digital) pen sensor 254 can be implemented, for example, using the same or similar method to receiving a user's touch input or a separate recognition sheet. The key 256 can be, for example, a keypad or a touch key.

The ultrasonic input device 258 is a device capable of sensing a sound wave by a microphone (e.g., a microphone 288) of the electronic device and confirming data through a pen generating an ultrasonic signal. The ultrasonic input device 258 can do wireless recognition. According to one exemplary embodiment, the hardware 200 can receive a user input from an external device (e.g., a network, a computer, or a server) connected to the hardware 200 using the communication module 230. The display module 260 can include a panel 262 or a hologram 264. The display module 260 can be, for example, the display module 150 illustrated in FIG. 2. The panel 262 can be, for example, a Liquid Crystal Display (LCD), an Active-Matrix Organic Light-Emitting Diode (AMOLED), or the like. The panel 262 can be implemented to be flexible, transparent, or wearable, for example.

The panel 262 can be constructed as one module together with the touch panel 252. The hologram 264 can show a three-dimensional image in the air by using interference of light. According to one exemplary embodiment, the display module 260 can further include a control circuit for controlling the panel 262 or the hologram 264. The interface 270 can include, for example, a High-Definition Multimedia Interface (HDMI) 272, a Universal Serial Bus (USB) 274, a projector 276, or a D-subminiature (D-sub) 278. Additionally or alternatively, the interface 270 can include, for example, Secure Digital/Multi Media Card (SD/MMC) (not shown), or Infrared Data Association (IrDA) (not shown).

The audio codec 280 can convert a voice and an electric signal interactively. The audio codec 280 can convert, for example, voice information that is inputted or outputted through a speaker 282, a receiver 284, an earphone 286, a microphone 288, or the like. The camera module 291 is a device capable of taking a picture and a video. According to one exemplary embodiment, the camera module 291 can include one or more image sensors (e.g., front lenses or rear lenses), an Image Signal Processor (ISP) (not shown), or a flash LED (not shown).

The power management module 295 can manage power of the hardware 200. Though not illustrated, the power management module 295 can include, for example, a Power Management Integrated Circuit (PMIC), a charging Integrated Circuit (IC), and a battery gauge. The PMIC can be mounted, for example, within an integrated circuit or a SoC semiconductor. A charging method can be divided into wired and wireless. The charging IC can charge a battery, and can prevent the inflow of overvoltage or overcurrent from an electric charger. According to one exemplary embodiment, the charging IC can include a charging IC for at least one of a wired charging method and a wireless charging method. As the wireless charging method, there are a magnetic resonance method, a magnetic induction method, an electromagnetic method and the like, for example. The charging IC can be added with a supplementary circuit for wireless charging, for example, a coil loop, a resonance circuit, a rectifier circuit or the like.

The battery gauge can measure, for example, a level of the battery 296, a charging voltage thereof, an electric current thereof, or a temperature thereof. The battery 296 can generate electricity and supply a power source. The battery 296 can be, for example, a chargeable cell. The indicator 297 can display a specific state of the hardware 200 or a part (e.g., the AP 211) thereof; for example, a booting state, a message state, a charging state or the like. The motor 298 can convert an electrical signal into a mechanical vibration. The processor 210 can control the sensor module 240.

Though not illustrated, the hardware 200 can include a processing device (e.g., a GPU) for mobile TV support. The processing device for mobile TV support can process, for example, standard media data of Digital Multimedia Broadcasting (DMB), Digital Video Broadcasting (DVB), a media flow or the like. The names of the aforementioned constituent elements of the hardware 200 according to the present disclosure can be varied according to the kind of the hardware 200. The hardware according to the present disclosure can include at least one of the aforementioned constituent elements, and can omit some constituent elements or further include additional other constituent elements. Also, some of the constituent elements of the hardware 200 according to the present disclosure are coupled and constructed as one entity, thereby being able to identically perform functions of the corresponding constituent elements of before being coupled.

Figure 4:
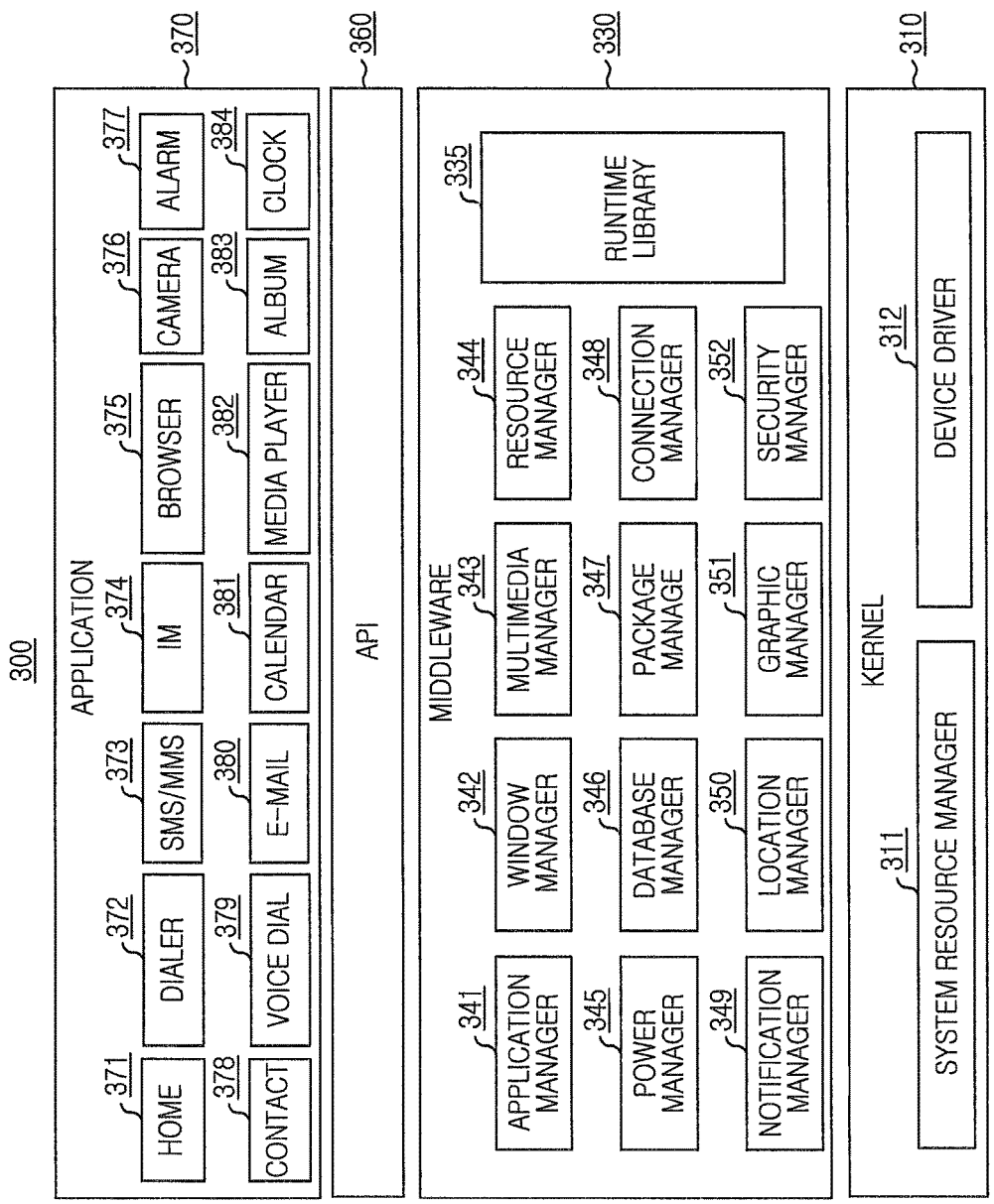
FIG. 4 is a block diagram illustrating a construction of a programming module according to one embodiment of the present disclosure.

FIG. 4 is a block diagram illustrating a construction of a programming module according to one exemplary embodiment of the present disclosure.

The programming module 300 can be included (e.g., stored) in the electronic device 100 (e.g., the memory 130) illustrated in FIG. 2. At least part of the programming module 300 can be constructed by software, firmware, hardware, or at least two or more combinations of them.

The programming module 300 can include an Operating System (OS) implemented in hardware (e.g., the hardware 200) and controlling resources related to an electronic device (e.g., the electronic device 100) or various applications (e.g., the application 370) driven on the operating system. For example, the operating system can be Android®, iPhone OS® (iOS®), Windows®, Symbian®, Tizen®, Badda®, or the like. Referring to FIG. 4, the programming module 300 can include a kernel 310, a middleware 330, an API 360, or an application 370. The application 370 can includes home 371, dialer 372, SMS/MMS 373, IM 374, browser 375, camera 376, alarm 377, contact 378, voice dial 379, e-mail 380, calendar 381, media player 382, album 383 and clock 384.

The kernel 310 (e.g., the kernel 131) can include a system resource manager 311 or a device driver 312. The system resource manager 311 can include, for example, a process management unit, a memory management unit, a file system management unit, or the like. The system resource manager 311 can perform control of a system resource, allocation thereof, recovery thereof, or the like. The device driver 312 can include, for example, a display driver, a camera driver, a Bluetooth driver, a shared memory driver, a USB driver, a keypad driver, a WiFi driver, or an audio driver.

Also, according to one exemplary embodiment, the device driver 312 can include an Inter-Process Communication (IPC) driver (not shown). The middleware 330 can include a plurality of modules previously implemented to provide a function commonly required by the application 370. Also, the middleware 330 can provide a function through the API 360 such that the application 370 can efficiently use a limited system resource within an electronic device.

For example, as illustrated in FIG. 4, the middleware 330 (e.g., the middleware 132) can include at least one of a runtime library 335, an application manager 341, a window manager 342, a multimedia manager 343, a resource manager 344, a power manager 345, a database manager 346, a package manager 347, a connection manager 348, a notification manager 349, a position manager 350, a graphic manager 351, and a security manager 352.

The runtime library 335 can include, for example, a library module that a compiler uses to add a new function through a programming language while the application 370 is run. According to one exemplary embodiment, the runtime library 335 can perform a function and the like for input/output, memory management or arithmetic function. The application manager 341 can manage, for example, a life cycle of at least one application among the applications 370. The window manager 342 can manage a GUI resource used in a screen. The multimedia manager 343 can grasp a format necessary for playing various media files, and perform encoding or decoding of a media file using a codec adapted to a corresponding format. The resource manager 344 can manage a resource such as a source code of at least any one application among the applications 370, a memory thereof, a storage space thereof, or the like.

The power manager 345 can operate together with a Basic Input/Output System (BIOS) and the like to manage a battery or power source, and provide power information and the like necessary for the operation. The database manager 346 can manage to create, search or change a database to be used in at least one application among the applications 370. The package manager 347 can manage installation or updating of an application which is distributed in a form of a package file. The connection manager 348 can manage, for example, wireless connection such as WiFi, Bluetooth or the like. The notification manager 349 can display or notify an event such as an arrival message, an appointment, a proximity notification and the like in a way not giving a disturbance to a user. The position manager 350 can manage position information of an electronic device.

The graphic manager 351 can manage a graphic effect to be provided to a user or a user interface related to this. The security manager 352 can provide a general security function necessary for system security, user authentication or the like. According to one exemplary embodiment, if an electronic device (e.g., the electronic device 100) has a phone function, the middleware 330 can further include a telephony manager (not shown) for managing a voice or video telephony function of the electronic device.

The middleware 330 can create and use a new middleware module through a combination of various functions of the aforementioned internal constituent element modules. The middleware 330 can provide a module specialized by kind of an operating system so as to provide a differentiated function. Also, the middleware 330 can dynamically delete some of the existing constituent elements or add new constituent elements. Accordingly, the middleware 330 can omit some of the constituent elements disclosed in an exemplary embodiment of the present disclosure or further include other constituent elements or substitute with a constituent element of a different name performing a similar function.

The API 360 (e.g., the API 133) is a set of API programming functions, and can be provided to have a different construction in accordance to an operating system. For example, Android® or iOS® can provide, for example, one API set by platform, and Tizen® can provide, for example, two or more API sets. The application 370 (e.g., the applications 134) can include, for example, a preload application or a third party application.

At least part of the programming module 300 can be implemented by an instruction stored in a computer-readable storage medium. When the instruction is executed by one or more processors (e.g., the processor 210), the one or more processors can perform a function corresponding to the instruction. The computer-readable storage medium can be, for example, the memory 260. At least part of the programming module 300 can be implemented (e.g., executed), for example, by the processor 210.

At least part of the programming module 300 can include, for example, a module, a program, a routine, an instruction set, a process or the like for performing one or more functions. The names of the constituent elements of the programming module (e.g., the programming module 300) according to the present disclosure can be varied in accordance to the kind of an operating system. Also, the programming module according to the present disclosure can include at least one or more of the aforementioned constituent elements, omit some of the aforementioned constituent elements, or further include additionally other constituent elements.

Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be modified in accordance to user and operator's intention or practice. Therefore, the terms should be defined on the basis of the disclosure throughout this specification.

A method for displaying in an electronic device and the electronic device thereof according to the present disclosure will be described below. The electronic device according to the present disclosure can include the constituent elements illustrated in FIG. 3. The processor 210 of the electronic device 200 can control the operations of the display module 260, the application module 211 and the like, so pictures of multiple layers can be displayed on a screen in a state where the pictures are sequentially lamination-layered.

That is, the processor 210 controls operations of the display module 260, the application module 211 and the like to sequentially create a main screen of a $1^{st}$ layer, a sub screen of a $2^{nd}$ layer and the like and display the main screen and the sub screen in a lamination-layered state through the display module 260. For example, the processor 210 lamination-layers and displays the sub screen including a keyboard on the $2^{nd}$ layer in a state of displaying the main screen including a $1^{st}$ input window (Input Window1) on the $1^{st}$ layer.

And, the processor 210 determines if the keyboard of the $2^{nd}$ layer is overlapped with the $1^{st}$ input window of the $1^{st}$ layer. If it is determined that the keyboard is overlapped with the $1^{st}$ input window, the processor 210 controls an operation of the application processor 211 to create, lamination-layer, and display a $2^{nd}$ input window (Input Window2) being a new virtual input window on a $3^{rd}$ layer (Layer3) of the display module 260.

And, the processor 210 displays a text and the like inputted by a user through the keyboard in the $2^{nd}$ input window of the $3^{rd}$ layer, so the user can easily confirm a key input state. On the other hand, in another exemplary embodiment, if it is determined that the keyboard is overlapped with the $1^{st}$ input window, the processor 210 controls the operation of the application processor 211 to adjust a transparency of the keyboard. For example, the processor 210 increases the transparency of the keyboard and displays in the $1^{st}$ input window of the $1^{st}$ layer the text and the like inputted by the user through the keyboard, so the user can easily confirm the key input state.

Figure 5:
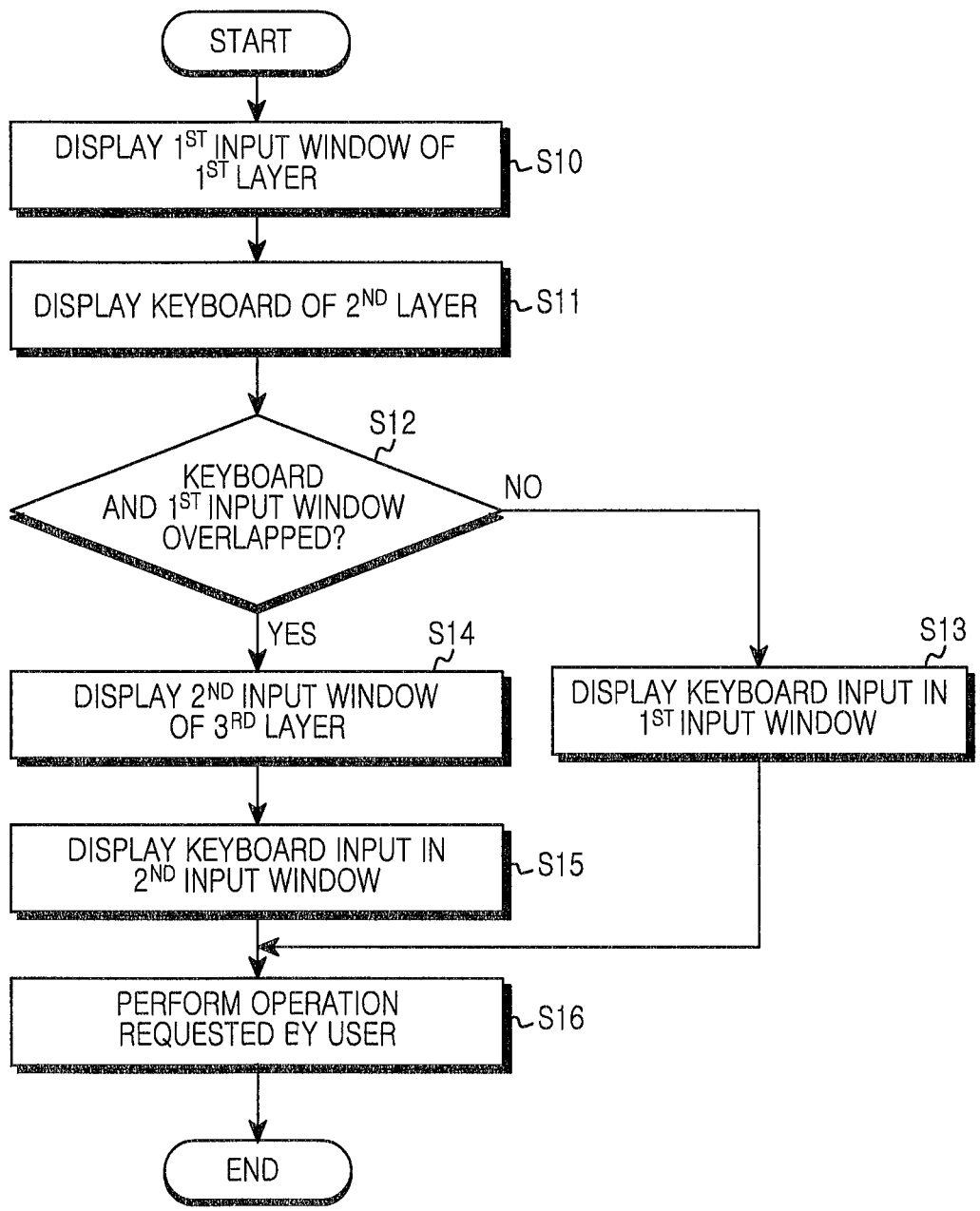
FIG. 5 is a flowchart illustrating a method for displaying in an electronic device according to one embodiment of the present disclosure.

FIG. 5 is a flowchart illustrating a method for displaying in an electronic device according to one exemplary embodiment of the present disclosure. As illustrated in FIG. 5, after a $1^{st}$ input window of a $1^{st}$ layer is displayed in the display module 260 (S10), a keyboard of a $2^{nd}$ layer is displayed in a state of being lamination-layered on the $1^{st}$ layer (S11). In some embodiments, when the first input window is selected, the virtual keyboard appears. In some embodiments, it is determined whether the virtual keyboard is overlapped with a letter display portion the first input window. If the keyboard is displayed as above, the processor 210 determines if the keyboard is overlapped with the $1^{st}$ input window (S12). If it is determined that the keyboard is not overlapped with the $1^{st}$ input window, the processor 210 displays in the $1^{st}$ input window a text and the like inputted through the keyboard (S13). If it is determined that the keyboard is overlapped with the $1^{st}$ input window, the processor 210 controls an operation of the application processor 211 to display in a $3^{rd}$ layer a $2^{nd}$ input window being a new virtual input window (S14).

Figure 6:
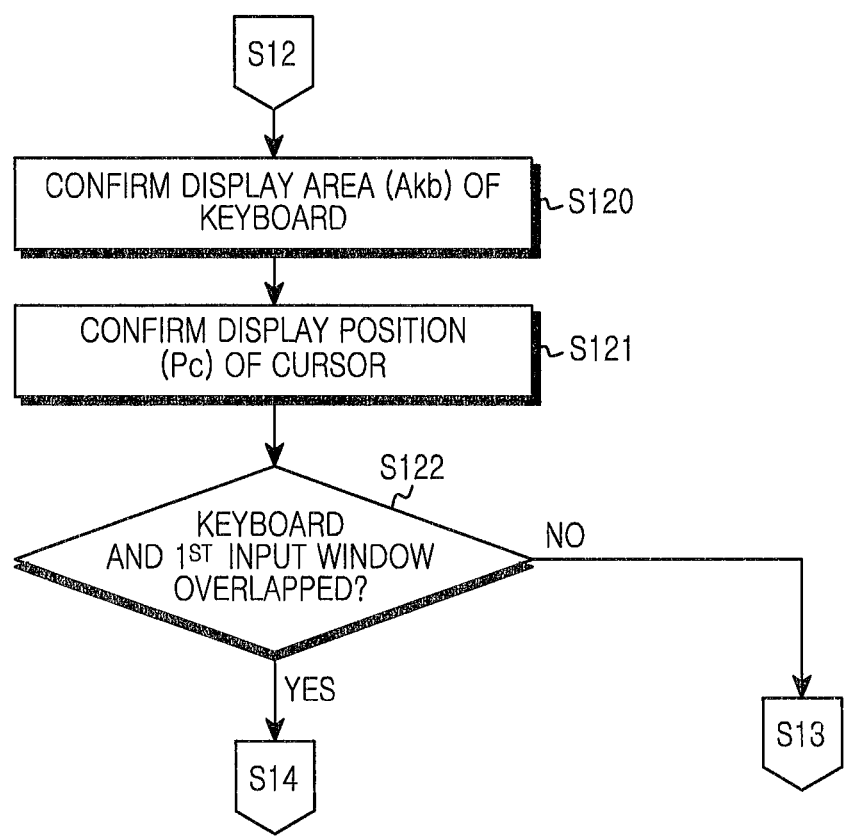
FIG. 6 is a flowchart illustrating a detailed operation in a method for displaying in an electronic device according to one embodiment of the present disclosure.

After displaying the text and the like inputted through the keyboard in the $2^{nd}$ input window of the $3^{rd}$ layer (S15), the processor 210 performs an operation requested by a user (S16). On the other hand, the processor 210 can determine if the keyboard is overlapped with the $1^{st}$ input window in accordance to various exemplary embodiments. For example, as illustrated in FIG. 6, the processor 210 confirms a display area (Akb) of the keyboard displayed in the $2^{nd}$ layer (S120). In some embodiments, letters are entered into the first input window and the second input window at a substantially same time as a user types the virtual keyboard.

Figure 7:
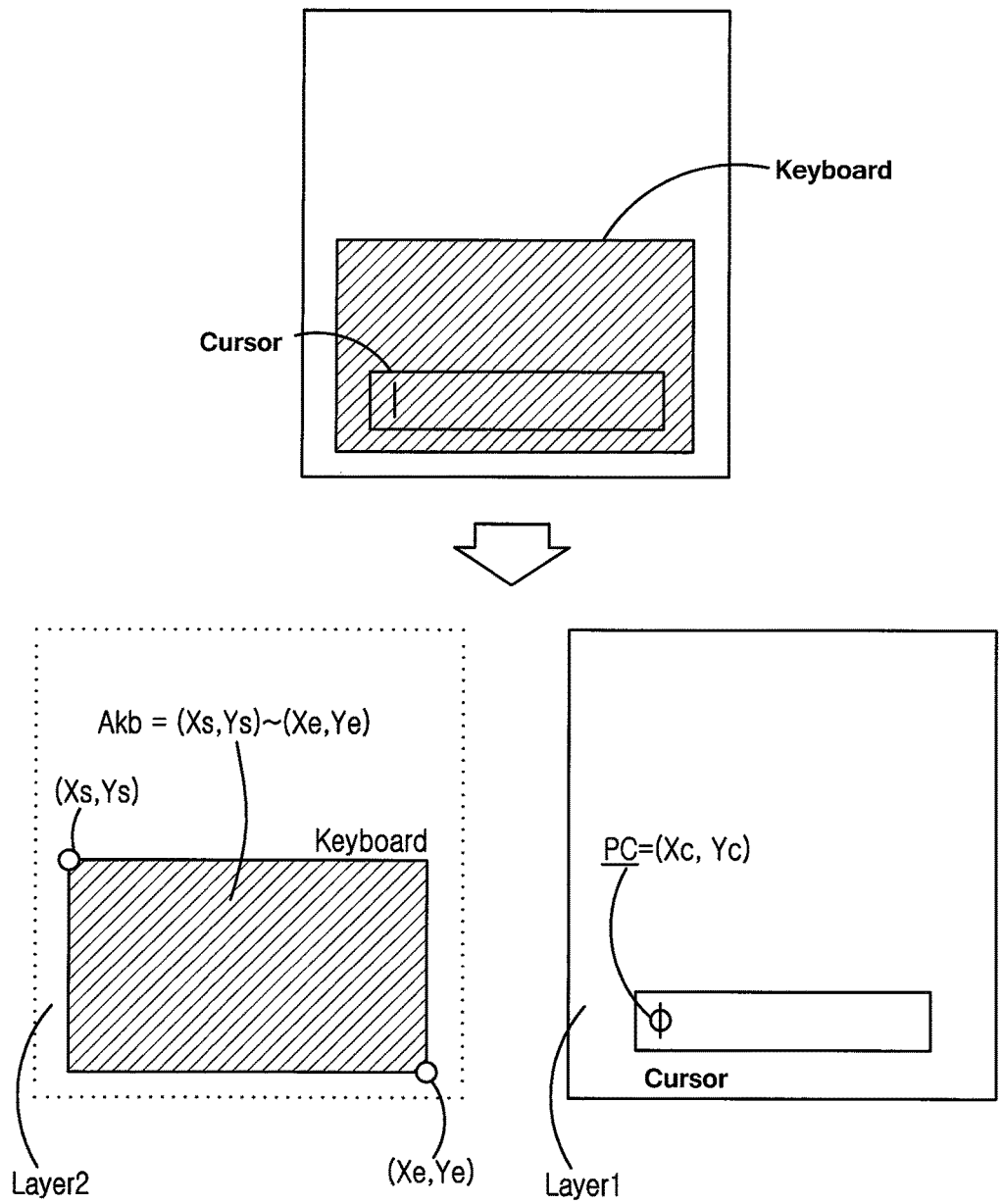
FIG. 7 is a diagram illustrating a process of determining overlap or non-overlap between a keyboard and a cursor in accordance to one embodiment of the present disclosure.

The processor 210 confirms a display position of a cursor displayed in the $1^{st}$ layer, that is, a display position (Pc) of the cursor activated in the $1^{st}$ input window (S121). After that, if the display position (Pc) of the cursor belongs within the display area (Akb) of the keyboard (S122), the processor 210 determines that the keyboard is overlapped with the $1^{st}$ input window. For example, as illustrated in FIG. 7, the display area (Akb) of the keyboard can be confirmed as an area having a starting point (Xs, Ys) and an ending point (Xe, Ye) on an X-Y coordinate of the $2^{nd}$ layer.

Figure 8:
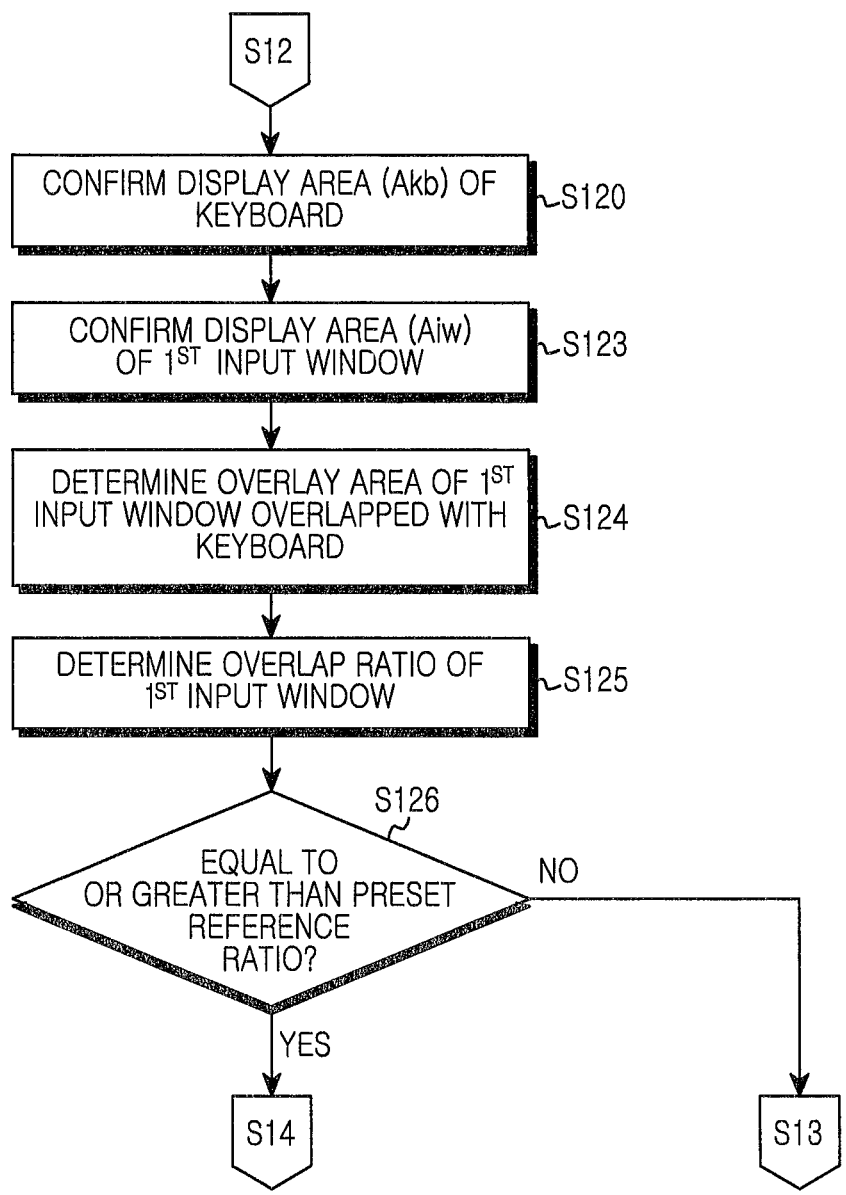
FIG. 8 is a flowchart illustrating a detailed operation in a method for displaying in an electronic device according to one embodiment of the present disclosure.

And, because the display position (Pc) of the cursor can be confirmed as an arbitrary one point (Xc, Ye) on an X-Y coordinate of the $1^{st}$ layer, the processor 210 can determine if the display position (Pc) of the cursor belongs to the display area (Akb) of the keyboard. On the other hand, in another exemplary embodiment, as illustrated in FIG. 8, the processor 210 confirms the display area (Akb) of the keyboard displayed in the $2^{nd}$ layer (S120), and confirms a display area (Aiw) of the $1^{st}$ input window displayed in the $1^{st}$ layer (S123).

Figure 9:
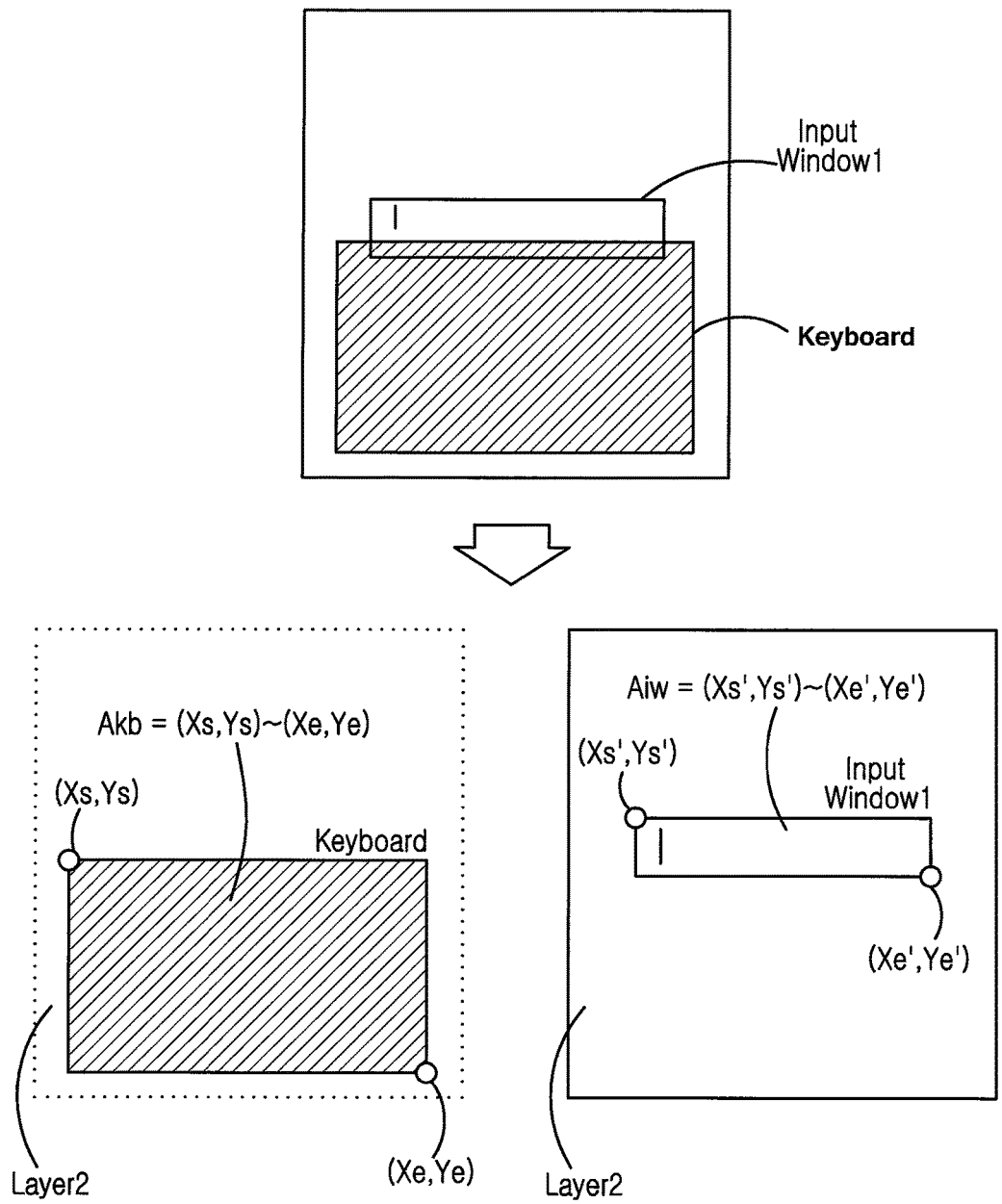
FIG. 9 is a diagram illustrating a process of determining overlap or non-overlap between a keyboard and an input window in accordance to one embodiment of the present disclosure.
Figure 10:
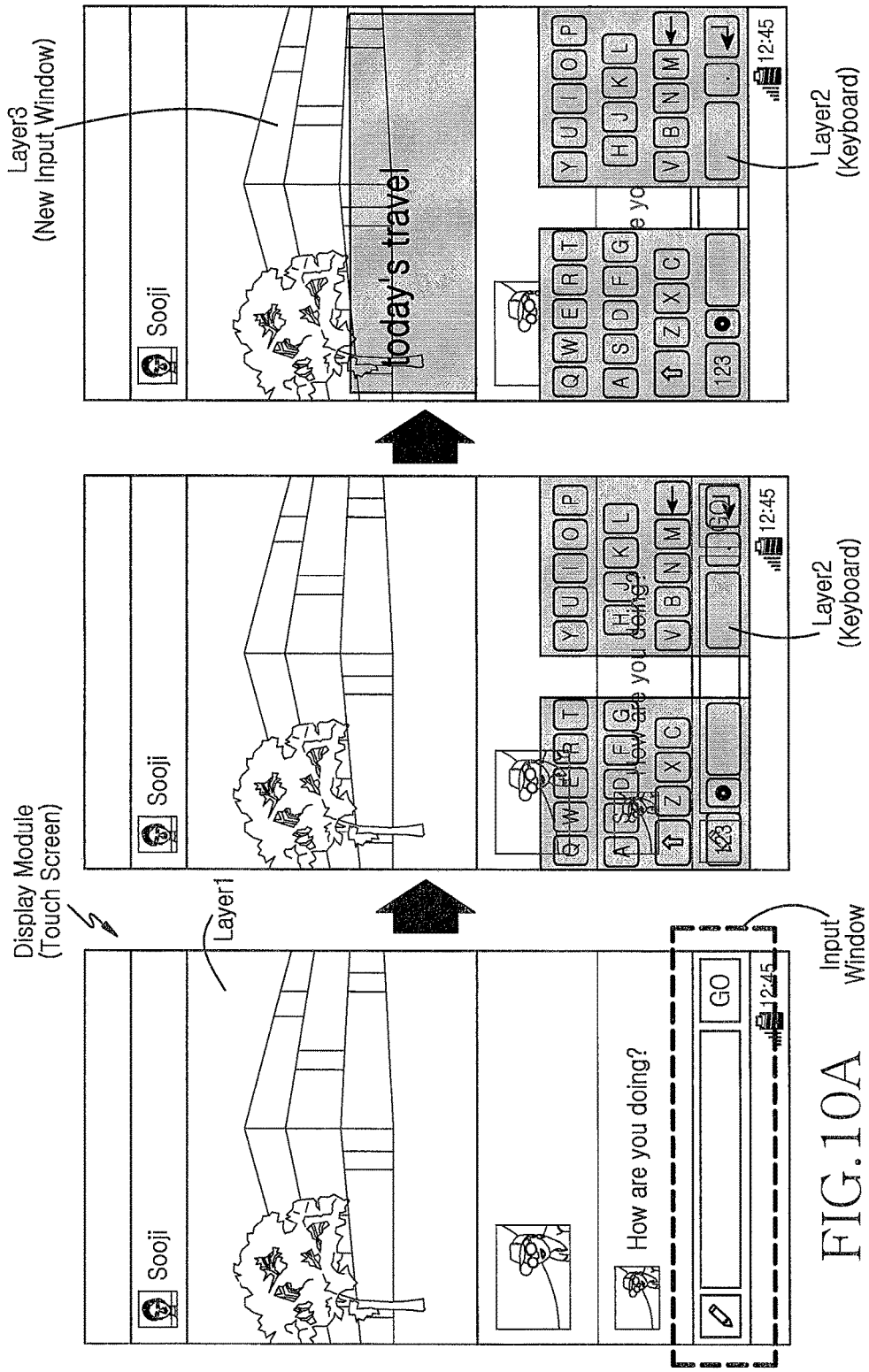
FIGS. 10A to 10C are diagrams illustrating that new input windows are displayed in a $3^{rd}$ layer in accordance to embodiments of the present disclosure.

The processor 210 confirms the display area (Aiw) of the $1^{st}$ input window overlapped with the display area (Akb) of the keyboard (S124). Next, the processor 210 confirms an overlap ratio (%) of the $1^{st}$ input window overlapped with the keyboard (S125). The overlap ratio (%) of the $1^{st}$ input window increases as the display area (Aiw) of the $1^{st}$ input window decreases or an overlap area of the $1^{st}$ input window overlapped with the display area (Akb) of the keyboard increases. For example, as illustrated in FIG. 9, the display area (Akb) of the keyboard can be confirmed as an area having a starting point (Xs, Ys) and an ending point (Xe, Ye) on an X-Y coordinate of the $2^{nd}$ layer.

Because the display area (Aiw) of the $1^{st}$ input window can be confirmed as an area having a starting point (Xs', Ys') and an ending point (Xe', Ye') on an X-Y coordinate of the $1^{st}$ layer, the processor 210 can determine the overlap area of the $1^{st}$ input window overlapped with the display area (Akb) of the keyboard and divide the determined overlap area by the entire area of the $1^{st}$ input window, thereby determining the overlap ratio (%). If the above-determined overlap ratio (%) of the $1^{st}$ input window is equal to or is greater than a preset reference ratio (S126), the processor 210 determines that the keyboard is overlapped with the $1^{st}$ input window. The reference ratio is set by a ratio between the display area of the $1^{st}$ input window overlapped with the display area of the keyboard, and the entire display area of the $1^{st}$ input window. For example, the reference ratio can be set and changed to be a value of at least 10% to 50% by a user.

Figure 11:
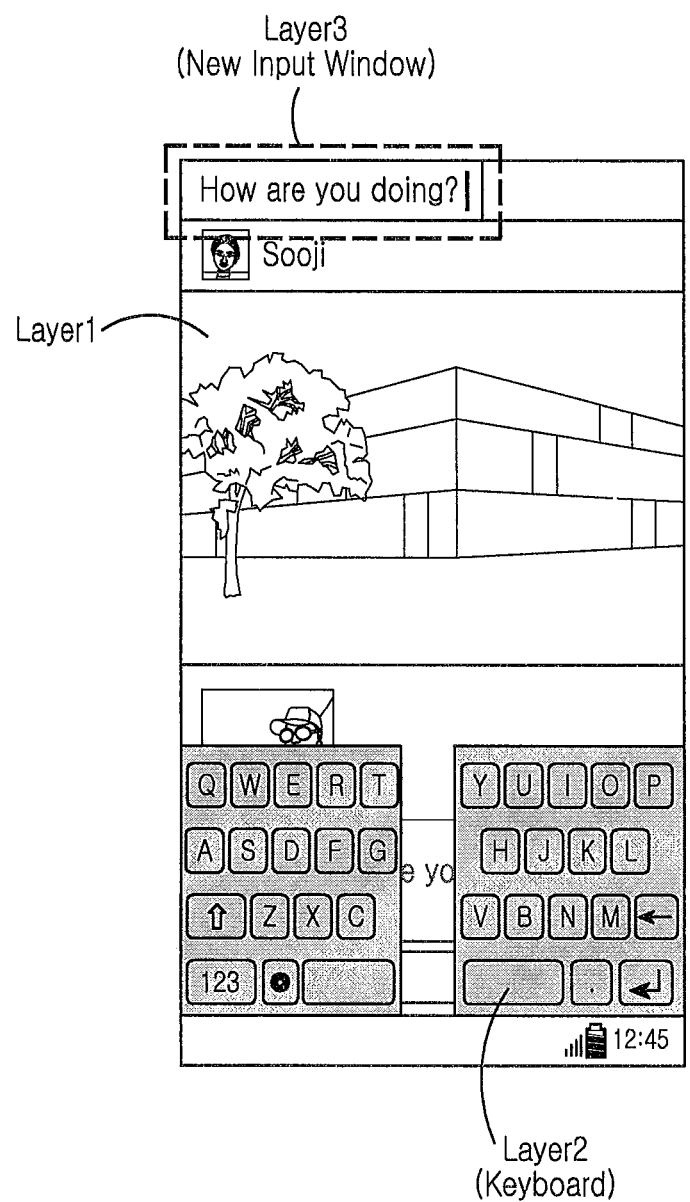
FIG. 11 is a diagram illustrating that a new input window is displayed in a $3^{rd}$ layer in accordance to another embodiment of the present disclosure.

If it is determined that the keyboard is overlapped with the $1^{st}$ input window, the processor 210 displays the $2^{nd}$ input window being the new virtual window in the $3^{rd}$ layer. The $2^{nd}$ input window of the $3^{rd}$ layer is displayed in other area not overlapped with the keyboard. For example, the $2^{nd}$ input window can be displayed in a center area of the $3^{rd}$ layer getting out of the display area (Akb) of the keyboard as illustrated in FIGS. 10A to 10C, or can be displayed in any one or more of outer areas of the $3^{rd}$ layer corresponding to an indicator display area of the $1^{st}$ layer as illustrated in FIG. 11.

Figure 12:
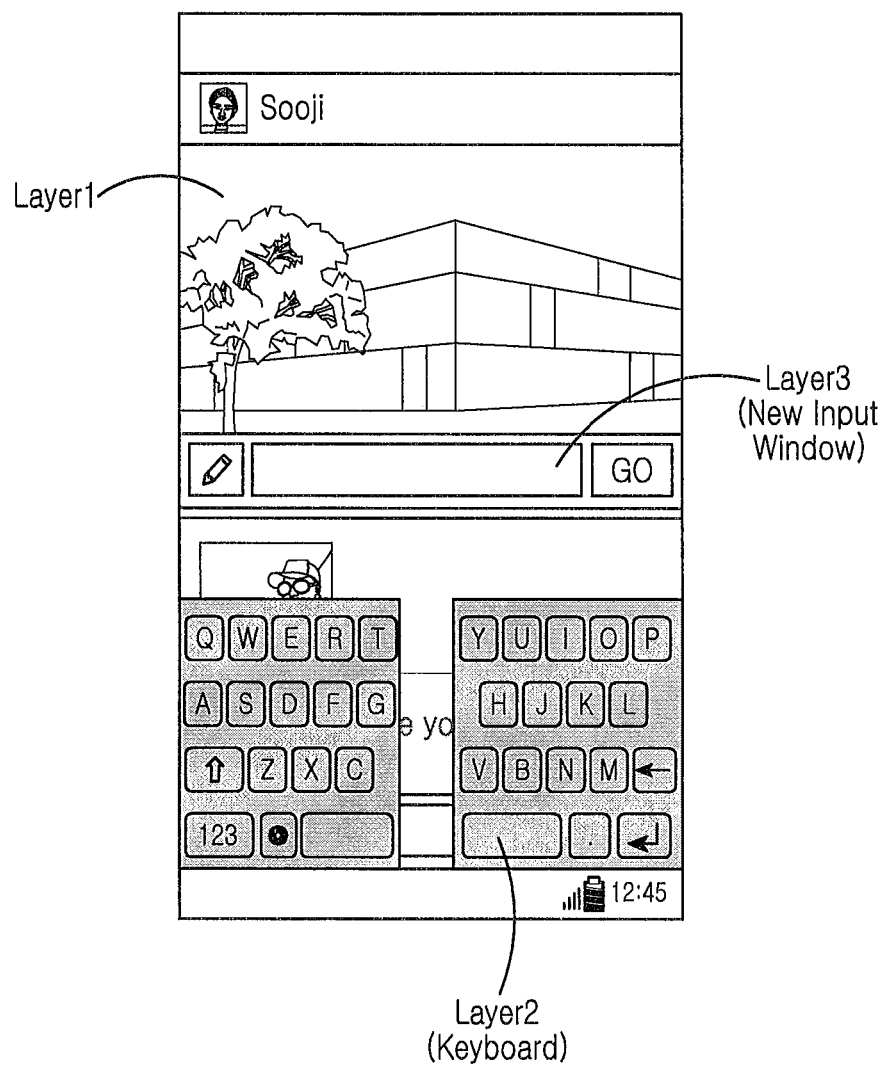
FIG. 12 is a diagram illustrating that a new input window is displayed in a $3^{rd}$ layer in accordance to a further embodiment of the present disclosure.

Also, the $2^{nd}$ input window can be created and displayed in a shape different from that of the $1^{st}$ input window, or can be copied and displayed in the same shape as that of the $1^{st}$ input window as illustrated in FIG. 12. For example, the processor 210 controls an operation of the application processor 211 to capture only an image portion corresponding to the $1^{st}$ input window among a main screen of the $1^{st}$ layer that is temporarily stored within the memory 220 or an image buffer (not shown). The processor 210 can copy and display the $2^{nd}$ input window in the same shape as that of the $1^{st}$ input window by creating the $2^{nd}$ input window of the same shape as that of the captured image portion of the $1^{st}$ input window and displaying the $2^{nd}$ input window in the $3^{rd}$ layer.

Figure 13:
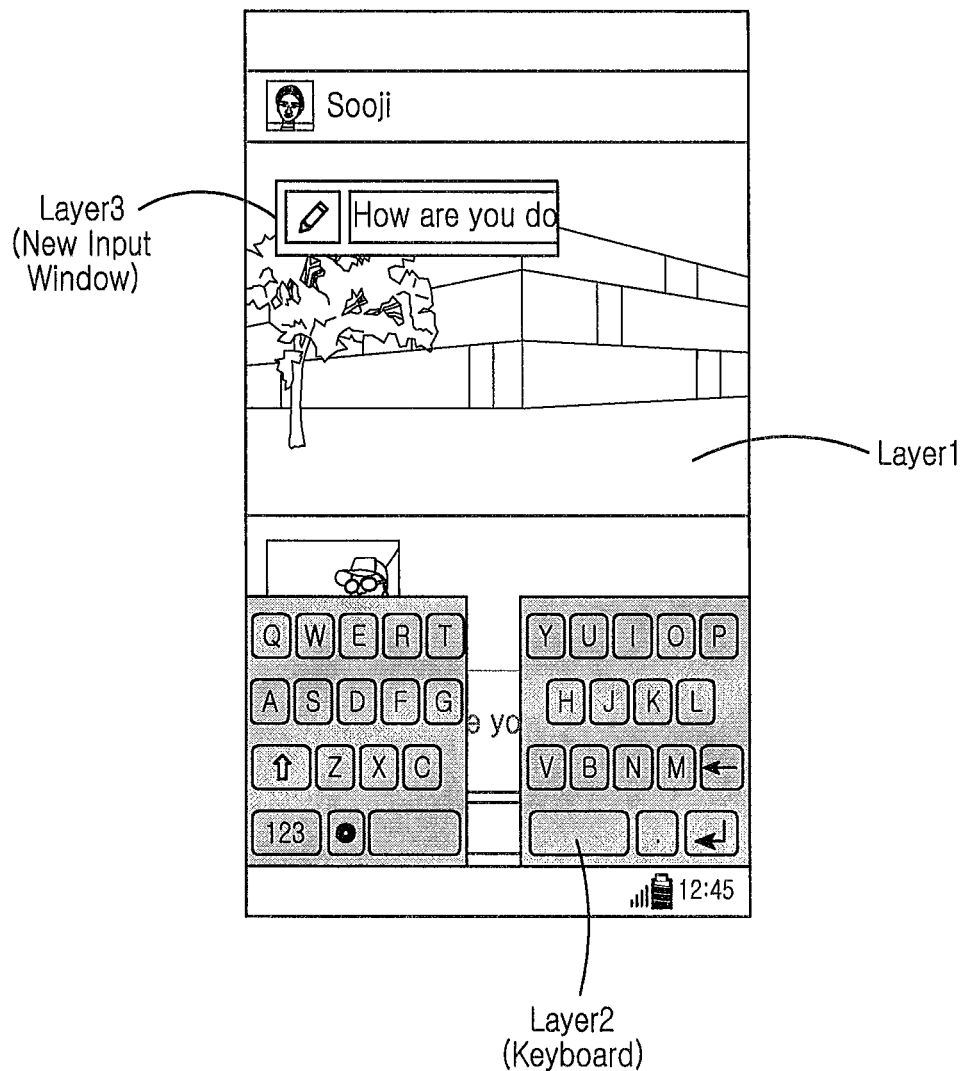
FIG. 13 is a diagram illustrating that a new input window is displayed in a $3^{rd}$ layer in accordance to a yet another embodiment of the present disclosure.

The $2^{nd}$ input window can be displayed at a transparency greater than a transparency of the $1^{st}$ input window. By this, the processor 210 can prevent a portion of the screen of the $1^{st}$ layer displayed under the $2^{nd}$ input window from being perfectly shielded by the opaque $2^{nd}$ input window. A horizontal length of the $2^{nd}$ input window can be fixed, or can gradually increase or decrease corresponding to a key input inputted through the keyboard as illustrated in FIG. 13. In this case, the processor 210 can minimize that the portion of the screen of the $1^{st}$ layer displayed under the $2^{nd}$ input window is shielded by the $2^{nd}$ input window of a long horizontal length.

The $2^{nd}$ input window can be displayed in a flashing state corresponding to a time interval of a key input inputted through the keyboard. Alternately, when there is no key input for a long time, the $2^{nd}$ input window can disappear temporarily. For example, if the time interval of the key input inputted through the keyboard exceeds a preset interval of 5 seconds, the processor 210 displays the $2^{nd}$ input window in the flashing state. If there is no key input during 10 seconds or longer, the $2^{nd}$ input window can disappear temporarily. The $2^{nd}$ input window can be additionally given various graphic effects such as a color, a shade, an outline and the like such that the $2^{nd}$ input window can be visually distinguished from the $1^{st}$ input window.

Figure 14:
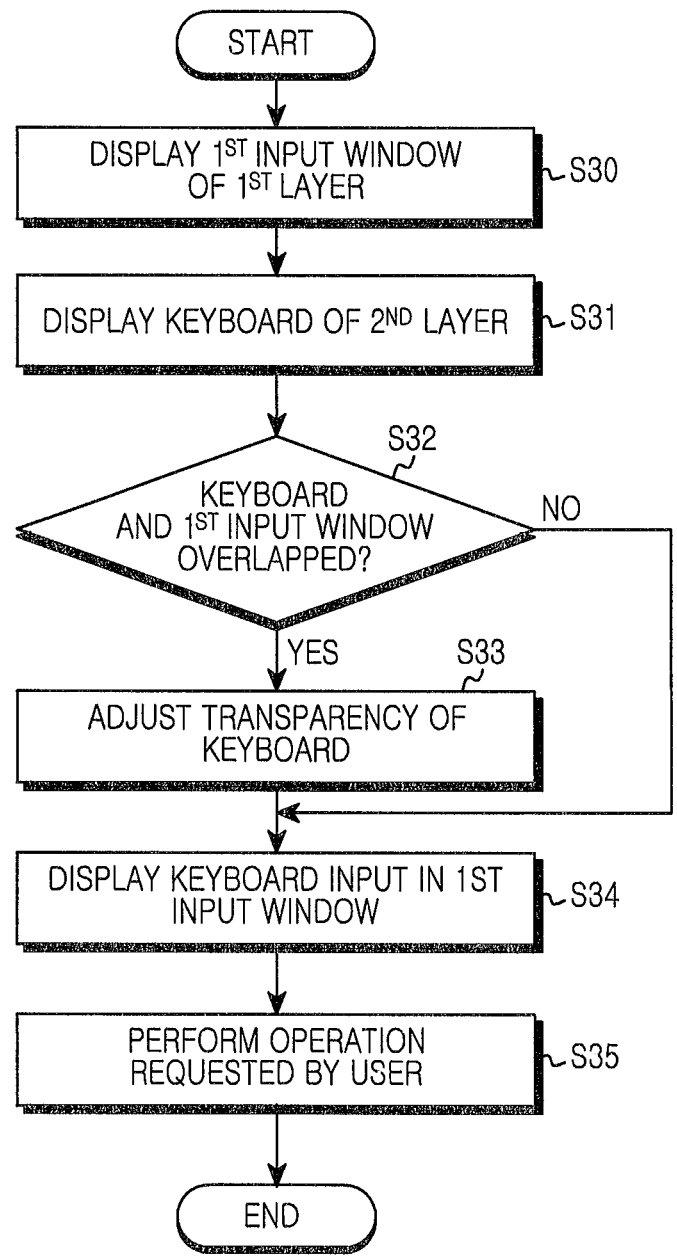
FIG. 14 is a flowchart illustrating a method for displaying in an electronic device according to another embodiment of the present disclosure.

FIG. 14 is a flowchart illustrating a method for displaying in an electronic device according to another exemplary embodiment of the present disclosure. As illustrated in FIG. 14, after a $1^{st}$ input window of a $1^{st}$ layer is displayed in the display module 260 (S30), a keyboard of a $2^{nd}$ layer is displayed in a state of being lamination-layered on the $1^{st}$ layer (S31). If the keyboard is displayed as above, the processor 210 determines if the keyboard is overlapped with the $1^{st}$ input window (S32). If it is determined that the keyboard is not overlapped with the $1^{st}$ input window, the processor 210 displays in the $1^{st}$ input window a text and the like inputted through the keyboard (S34). If it is determined that the keyboard is overlapped with the $1^{st}$ input window, the processor 210 controls an operation of the application processor 211 to adjust a transparency of the keyboard (S33). In some embodiments, the virtual keyboard becomes transparent such that the letter of the first input window is visible through the virtual keyboard.

Figures 15A, 15B, 15C:
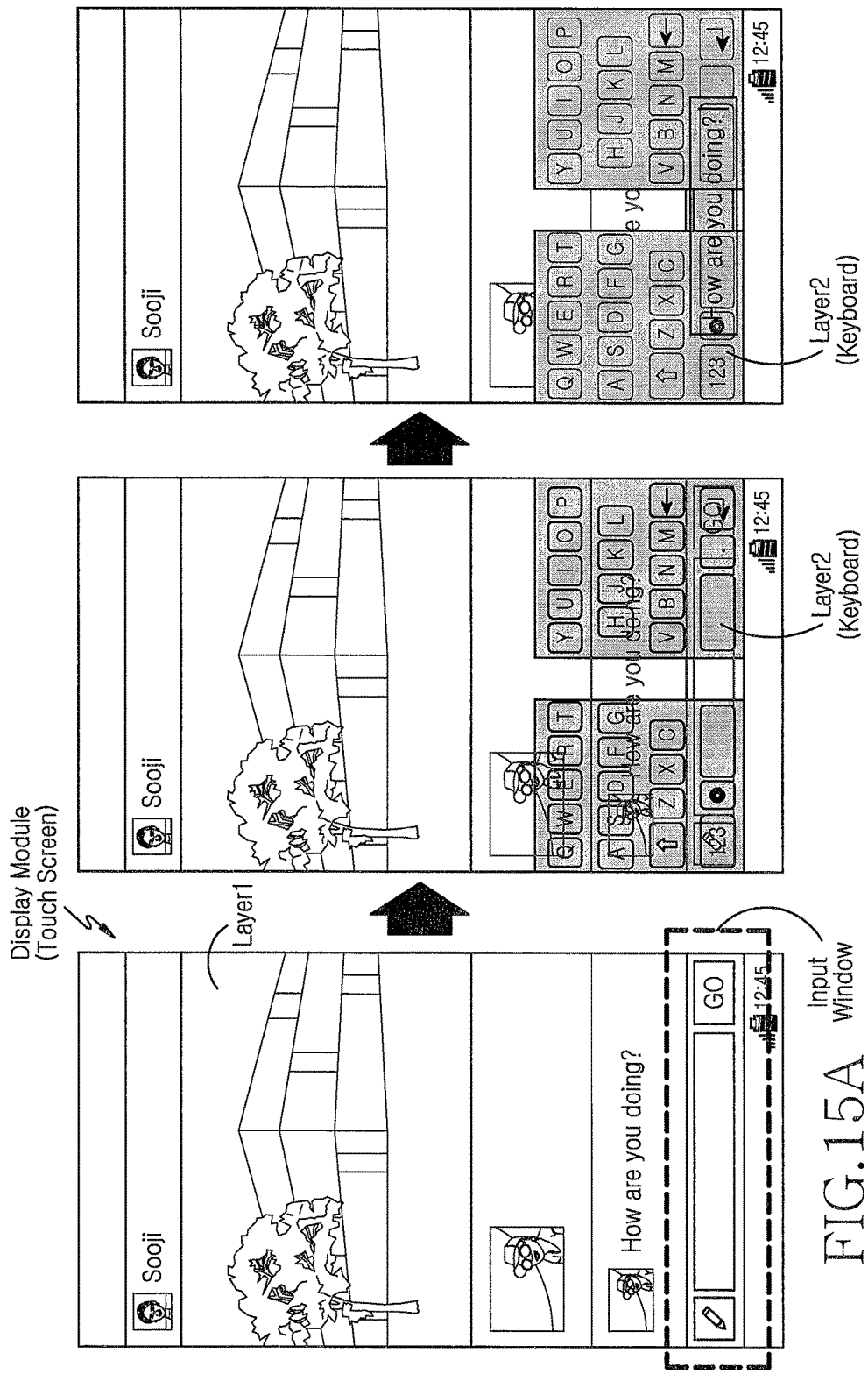
FIGS. 15A to 15C are diagrams illustrating that a transparency of a keyboard is adjusted in accordance to one embodiment of the present disclosure.

That is, as illustrated in FIGS. 15A to 15C, the processor 210 increases the transparency of the keyboard (S33). Next, the processor 210 displays the text and the like inputted using the keyboard in the $1^{st}$ input window (S34). After that, the processor 210 performs an operation requested by a user (S35). For example, as mentioned above with reference to FIG. 7, the processor 210 confirms the display area (Akb) of the keyboard and the display position (Pc) of the cursor. After that, if the display position (Pc) of the cursor belongs within the display area (Akb) of the keyboard, the processor 210 determines that the keyboard is overlapped with the $1^{st}$ input window.

Figure 16:
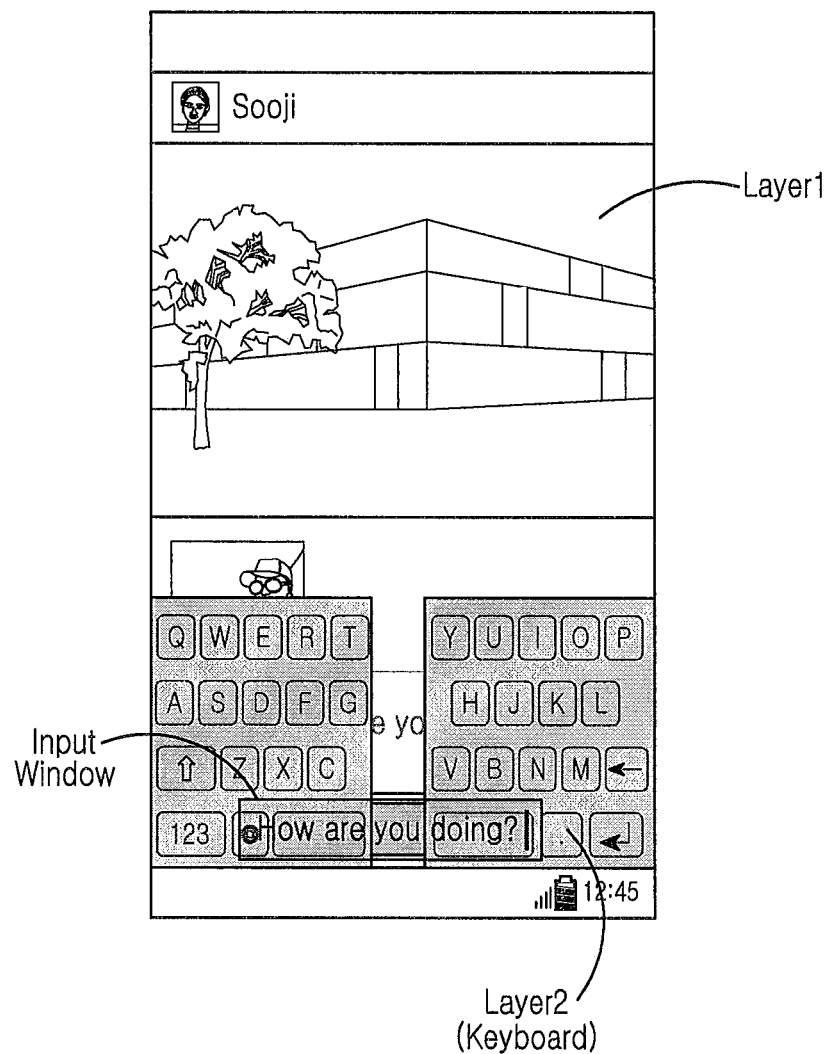
FIG. 16 is a diagram illustrating that a transparency of a keyboard is adjusted in accordance to another embodiment of the present disclosure.
Figure 17:
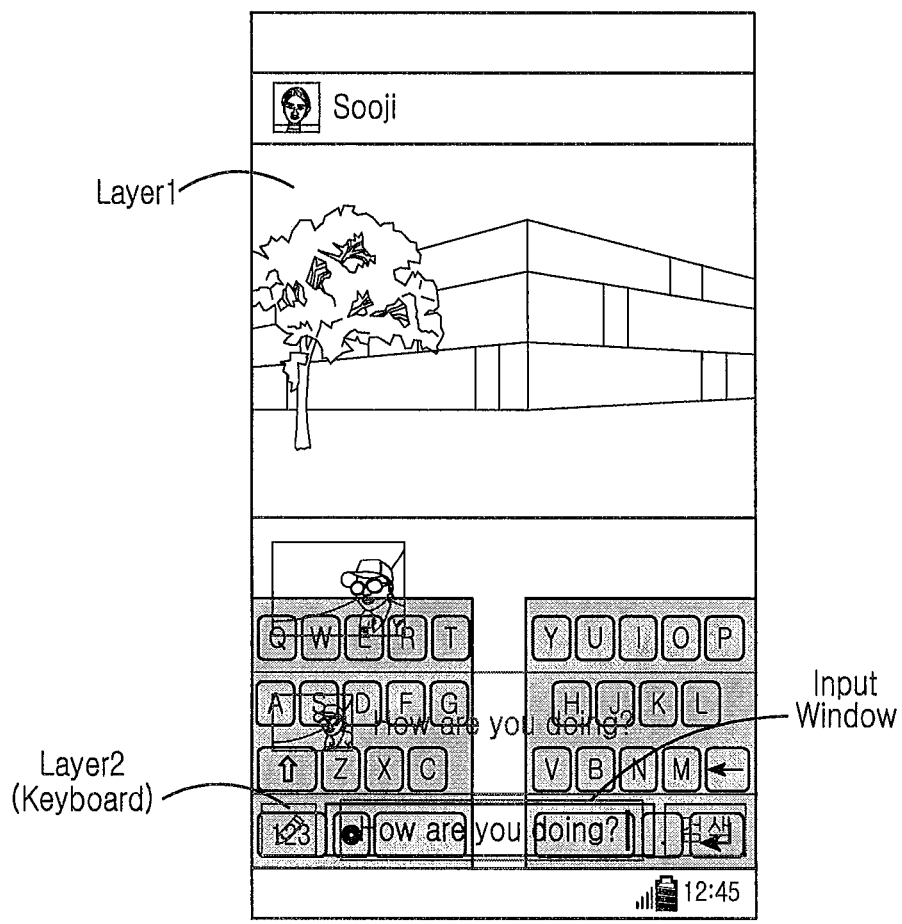
FIG. 17 is a diagram illustrating that a transparency of a keyboard is adjusted in accordance to a further embodiment of the present disclosure.

Also, in another exemplary embodiment, as mentioned above with reference to FIG. 9, the processor 210 confirms the display area (Akb) of the keyboard and the display area (Aiw) of the $1^{st}$ input window. After that, the processor 210 determines an overlap area in which the display area (Aiw) of the $1^{st}$ input window is overlapped with the display area (Akb) of the keyboard. If the overlap ratio (%) of the $1^{st}$ input window is equal to or is greater than a preset reference ratio, the processor 210 determines that the keyboard is overlapped with the $1^{st}$ input window. If it is determined that the keyboard is overlapped with the $1^{st}$ input window, as illustrated in FIG. 16, the processor 210 entirely increases the transparency of the keyboard such that the user can see the $1^{st}$ input window displayed under the keyboard.

In this case, it is desirable that the transparency of the keyboard does not exceed the maximum 50% such that the user suffer no inconvenience in selecting and touching a key button of the keyboard. In another exemplary embodiment, the transparency of the keyboard can be partially increased in accordance to overlap or non-overlap with the $1^{st}$ input window. For example, as illustrated in FIG. 7, only a transparency of an overlap area of the keyboard overlapped with the $1^{st}$ input window can be partially increased.

According to various exemplary embodiments of the present disclosure, when a keyboard displayed in a $2^{nd}$ layer is overlapped with an input window displayed in a $1^{st}$ layer, the processor 210 displays a new input window in a $3^{rd}$ layer, so a user can easily confirm through the new input window of the $3^{rd}$ layer a text and the like inputted using the keyboard.

According to various exemplary embodiments of the present disclosure, when a keyboard displayed in a $2^{nd}$ layer is overlapped with an input window displayed in a $1^{st}$ layer, the processor 210 adjusts a transparency of the keyboard, so the user can easily confirm through the input window of the $1^{st}$ layer a text and the like inputted using the keyboard.

Methods according to exemplary embodiments disclosed in claims and/or specification of the present disclosure can be implemented in a form of hardware, software, or a combination of hardware and software. When the methods are implemented by software, a computer-readable storage medium storing one or more programs (i.e., software modules) can be provided. The one or more programs stored in the computer-readable storage medium are configured to be executed by one or more processors within an electronic device. The one or more programs can include instructions for enabling the electronic device to execute the methods according to the exemplary embodiments disclosed in the claims and/or specification of the present disclosure.

These programs (i.e., software modules or software) can be stored in a Random Access Memory (RAM), a nonvolatile memory including a flash memory, a ROM, an EEPROM, a magnetic disk storage device, a Compact Disk ROM (CD-ROM), a Digital Versatile Disk (DVD) or an optical storage device of other form, and a magnetic cassette. Or, the programs can be stored in a memory constructed by a combination of some or all of them. Also, each constructed memory can be included in plural number.

Also, the programs can be stored in an attachable storage device accessible to the electronic device through a communication network such as the Internet, an intranet, a Local Area Network (LAN), a Wireless LAN (WLAN) and a Storage Area Network (SAN) or a communication network constructed by a combination of them. This storage device can access a device performing an exemplary embodiment of the present disclosure through an external port. Also, a separate storage device on a communication network can access the device performing the exemplary embodiment of the present disclosure.

In the aforementioned detailed exemplary embodiments of the present disclosure, constituent elements of the disclosure have been expressed in the singular number or the plural number in accordance to the proposed detailed exemplary embodiments. But, the expression of the singular number or plural number is selected adaptive to a proposed situation for description's convenience, and it is not that the present disclosure is limited to singular or plural constituent elements. Despite the constituent elements expressed in the plural number, the constituent elements can be constructed in the singular number, or despite the constituent elements expressed in the singular number, the constituent elements can be constructed in the plural number. While the disclosure has been shown and described with reference to certain preferred embodiments thereof, it is undoubted that various changes in form and details can be made therein without departing from the spirit and scope of the disclosure. Therefore, the spirit and scope of the disclosure should not be limited and defined by the described exemplary embodiments and should be defined by not only the appended claims but also equivalents to the appended claims.

What is claimed is:

1. A method for operating an electronic device, the method comprising:
    displaying a first input window and at least one content, on a screen;
    displaying, in response to detecting an input on the first input window, a virtual keyboard covering at least a portion of the first input window, and a second input window spaced apart from the virtual keyboard that covers the at least the portion of the first input window, on the screen, wherein the second input window represents the first input window, and wherein the second input window is displayed in an indicator area of the screen that is spaced apart from the at least one content;
    detecting at least one input on at least one key included in the virtual keyboard being displayed;
    displaying, in response to detecting the at least one input, the first input window including at least one character indicated by the at least one key and the second input window representing the first input window including the at least one character inputted by the at least one input;
    determining that a time interval in which no key input is detected exceeds a first preset time interval;
    displaying, in response to the determination that the time interval exceeds the first preset time interval, the second input window in a flashing state;
    after displaying the second input window in the flashing state, determining that the time interval exceeds a second preset time interval; and
    removing, in response to the determination that the time interval exceeds the second preset time interval, the second input window from the indicator area of the screen.

2. The method of claim 1, wherein the first input window includes a cursor.

3. The method of claim 2, wherein displaying the virtual keyboard and the second input window comprises:
    in response to detecting the input on the first input window,
    identifying whether a position of the cursor is located within another area where the virtual keyboard is displayed;
    determining, based on an identification that the position of the cursor is located within the other area where the virtual keyboard is displayed, that the virtual keyboard covers the at least the portion of the first input window; and
    displaying, based on the determination, the virtual keyboard covering the at least the portion of the first input window and the second input window spaced from the virtual keyboard that covers the at least the portion of the first input window.

4. The method of claim 1, wherein displaying the virtual keyboard and the second input window comprises:
    in response to detecting the input on the first input window, identifying an overlap ratio based on an area of the at least the portion of the first input window which is covered by the virtual keyboard;
    upon determining that the identified overlap ratio is greater than a reference ratio, determining that the virtual keyboard covers the at least the portion of the first input window; and
    displaying, based on the determination, the virtual keyboard covering the at least the portion of the first input window and the second input window spaced from the virtual keyboard that covers the at least the portion of the first input window.

5. The method of claim 1, wherein a horizontal length of the displayed second input window is gradually extended as a number of the at least one character increases.

6. An electronic device comprising:
    a display; and
    a processor, operatively coupled to the display, configured to:
        control to display a first input window and at least one content, on a screen;
        control to display, in response to detecting an input on the first input window, a virtual keyboard covering at least a portion of the first input window, and a second input window spaced apart from the virtual keyboard that covers the at least the portion of the first input window, on the screen, wherein the second input window represents the first input window, and wherein the second input window is displayed in an indicator area of the screen that is spaced apart from the at least one content;
        control to detect at least one input on at least one key included in the virtual keyboard being displayed;
        control to display, in response to detecting the at least one input, the first input window including at least one character indicated by the at least one key and the second input window representing the first input window including the at least one character inputted by the at least one input;
        control to determine that a time interval in which no key input is detected exceeds a first preset time interval;
        control to display, in response to the determination that the time interval exceeds the first preset time interval, the second input window in a flashing state;
        after displaying the second input window in the flashing state, control to determine that the time interval exceeds a second preset time interval; and control to remove, in response to the determination that the time interval exceeds the second preset time interval, the second input window from the indicator area of the screen.

7. The electronic device of claim 6, wherein the first input window includes a cursor.

8. The electronic device of claim 7, wherein the processor is configured to:
- in response to detecting the input on the first input window, identify whether a position of the cursor is located within another area where the virtual keyboard is displayed;
- determine, based on identifying that the position of the cursor is located within the other area where the virtual keyboard is displayed, that the displayed virtual keyboard covers the at least the portion of the first input window; and
- control to display, based on the determination, the virtual keyboard covering the at least the portion of the first input window and the second input window spaced from the virtual keyboard that covers the at least the portion of the first input window.

9. The electronic device of claim 6, wherein the processor is configured to:
- in response to detecting the input on the first input window, identify an overlap ratio based on an area of the at least the portion of the first input window which is covered by the virtual keyboard;
- upon determining that the identified overlap ratio is greater than a reference ratio, determine that the virtual keyboard covers the at least the portion of the first input window; and
- control to display, based on the determination, the virtual keyboard covering the at least the portion of the first input window and the second input window spaced from the virtual keyboard that covers the at least the portion of the first input window.

10. The electronic device of claim 6, wherein a horizontal length of the displayed second input window is gradually extended as a number of the at least one character increases.

11. A non-transitory computer-readable storage medium for storing one or more programs for executing an operation of:
- displaying a first input window and at least one content, on a screen;
- displaying, in response to detecting an input on the displayed first input window, a virtual keyboard covering at least a portion of the first input window, and a second input window spaced apart from the virtual keyboard that covers the at least the portion of the first input window, on the screen, wherein the second input window represents the first input window, and wherein the second input window is displayed in an indicator area of the screen that is spaced apart from the at least one content;
- detecting at least one input on at least one key included in the virtual keyboard being displayed;
- displaying, in response to detecting the at least one input, the first input window including at least one character indicated by the at least one key and the second input window representing the first input window including the at least one character inputted by the at least one input;
- determining that a time interval in which no key input is detected exceeds a first preset time interval;
- displaying, in response to the determination that the time interval exceeds the first preset time interval, the second input window in a flashing state;
- after displaying the second input window in the flashing state, determining that the time interval exceeds a second preset time interval; and
- removing, in response to the determination that the time interval exceeds the second preset time interval, the second input window from the indicator area of the screen.

* * * * *